United States Patent
Creamer et al.

(10) Patent No.: US 7,653,692 B2
(45) Date of Patent: Jan. 26, 2010

(54) METHOD, SYSTEM, AND APPARATUS FOR GENERATING WEBLOGS FROM INTERACTIVE COMMUNICATION CLIENT SOFTWARE

(75) Inventors: Thomas E. Creamer, Boca Raton, FL (US); Bill H. Hilf, La Habra, CA (US); Neil A. Katz, Parkland, FL (US); Craig A. Swearingen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 10/736,025

(22) Filed: Dec. 15, 2003

(65) Prior Publication Data

US 2005/0132056 A1 Jun. 16, 2005

(51) Int. Cl.
*G06F 15/16* (2006.01)
(52) U.S. Cl. ..................................... 709/206
(58) Field of Classification Search ................. 709/206
See application file for complete search history.

(56) References Cited

U.S. PATENT DOCUMENTS

| | | | |
|---|---|---|---|
| 5,990,887 A | 11/1999 | Redpath et al. | |
| 6,463,460 B1 | 10/2002 | Simonoff | |
| 6,791,582 B2 * | 9/2004 | Linsey et al. | 715/751 |
| 7,069,003 B2 * | 6/2006 | Lehikoinen et al. | 455/414.2 |
| 7,194,536 B2 * | 3/2007 | Fellenstein et al. | 709/224 |
| 2002/0073162 A1 | 6/2002 | McErlean | |
| 2002/0118809 A1 | 8/2002 | Eisenberg | |
| 2002/0140730 A1 * | 10/2002 | Linsey et al. | 345/751 |
| 2002/0161896 A1 | 10/2002 | Wen et al. | |
| 2003/0001890 A1 | 1/2003 | Brin | |
| 2003/0005126 A1 | 1/2003 | Schwartz et al. | |
| 2003/0037103 A1 | 2/2003 | Salmi et al. | |
| 2003/0043190 A1 | 3/2003 | Bernius et al. | |
| 2003/0065721 A1 * | 4/2003 | Roskind | 709/204 |
| 2003/0078972 A1 | 4/2003 | Tapissier et al. | |
| 2003/0088623 A1 | 5/2003 | Kusuda | |
| 2003/0105812 A1 | 6/2003 | Flowers, Jr. et al. | |
| 2004/0078435 A1 | 4/2004 | Dunbar et al. | |
| 2004/0078446 A1 * | 4/2004 | Daniell et al. | 709/206 |
| 2005/0075097 A1 * | 4/2005 | Lehikoinen et al. | 455/414.1 |
| 2005/0086309 A1 * | 4/2005 | Galli et al. | 709/206 |

OTHER PUBLICATIONS

Stone, Biz, "Blogging: Genius Strategies for Instant Web Content", Copyright: New Riders, Sep. 11, 2002, ISBN: 0-7357-1299-9, Chapters 16 & 18.*
Saunders, Christopher, "Merging IM With Blogging", Instant Messaging Planet, Jul. 3, 2003.*
Lindahl et al., "Weblogs: simplifying web publishing", Computer vol. 36, Issue 11, Nov. 2003 pp. 114-116.*
Landon et al., "Deploying Lotus Sametime on the IBM eserver iSeries Server", Redbooks, IBM International Technical Support Organization, Jun. 2002.*

* cited by examiner

*Primary Examiner*—Vivek Srivastava
*Assistant Examiner*—William J Goodchild
(74) *Attorney, Agent, or Firm*—Novak Druce + Quigg LLP

(57) ABSTRACT

A method of sharing instant messaging transcripts can include establishing an instant messaging session. The method can also include receiving a user request to publish a transcript of the session to a Weblog and publishing the transcript to the Weblog.

13 Claims, 3 Drawing Sheets

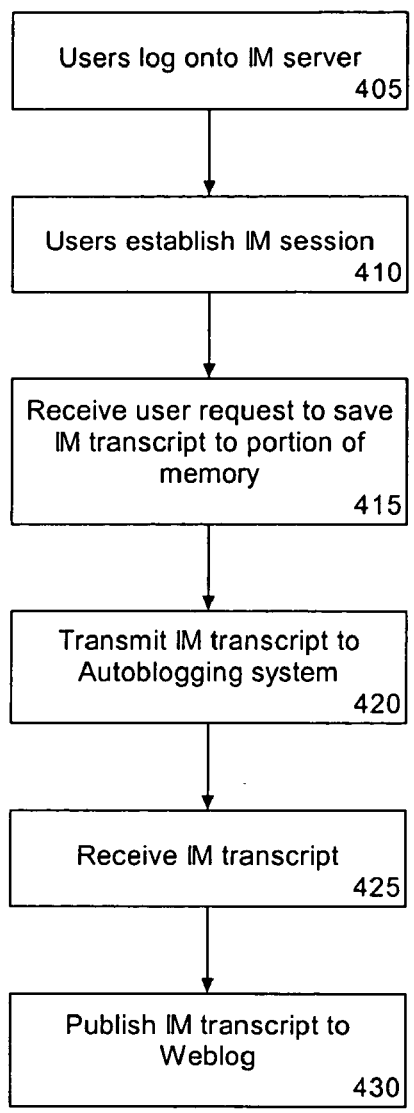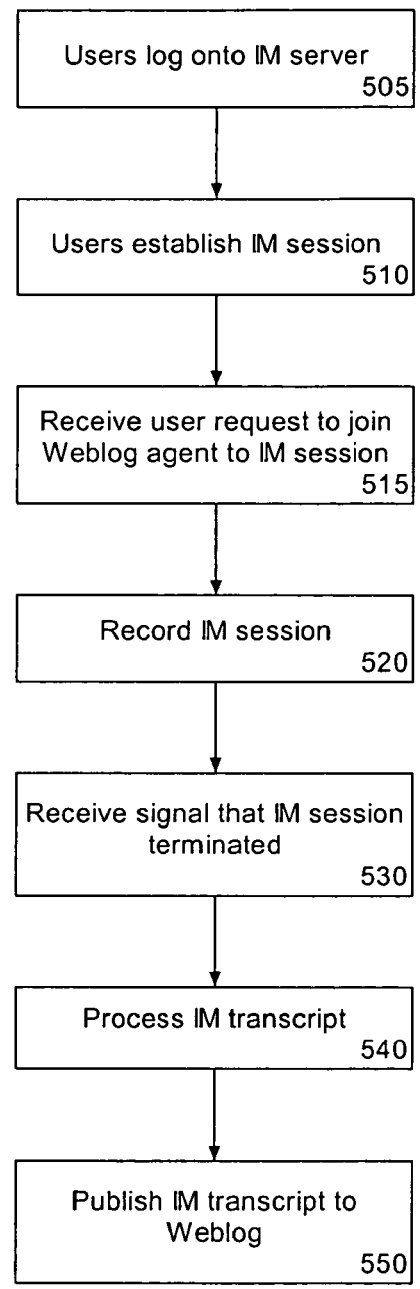
FIG. 4
FIG. 5

METHOD, SYSTEM, AND APPARATUS FOR GENERATING WEBLOGS FROM INTERACTIVE COMMUNICATION CLIENT SOFTWARE

BACKGROUND

1. Field of the Invention

The invention relates to the field of Internet-based communications and messaging, and more particularly, to the integration of instant messaging and Weblog publishing.

2. Description of the Related Art

Text-based Internet communication systems, such as instant messaging and chat over a data communications link, have become increasingly popular due to the substantially real time nature of the communication, low cost, and simplicity of use. Instant messaging allows users to communicate over a communications network in substantially real time. That is, instant messaging is a service which enables users to send relatively immediate messages to one another over a communications network using communications devices such as wireless telephones, pagers, computers, and personal digital assistants (PDAs).

Typically, the instant messaging service is hosted by a server running an instant messaging application which facilitates communications between devices equipped with a specialized messaging software. The messaging software, referred to as the instant messaging or chat client, normally includes a graphical user interface (GUI) containing a message text window in which both incoming and outgoing instant messages (IMs) can be presented to an end user. The window is invoked when a user either types in an IM, or receives an IM from another user. Typically the IMs are displayed on the window in the form of scrolling dialog.

Instant messaging technology has progressed from single line text-based interfaces to more sophisticated GUI-based clients. These GUI-based clients can process still images, real time images, text data, and information about a particular user. Accordingly, conventional instant messaging systems can support the exchange of attachments, which are electronic files such as images, documents, or binary objects which can be attached to an IM and transmitted therewith from a sender to a recipient. Attachments can also include multimedia files such as audio and video. For example, during an instant messaging exchange, in addition to seeing the text typed by a participant, a business user can view the video recording of a keynote speech, listen to the audio of a message recorded on a colleague's voicemail system, or simply receive such files as attachments to IM communications.

In the business environment, users have found that instant messaging is an effective tool for facilitating virtual conferences, and enabling individuals to easily collaborate on projects. Also gaining popularity in the area of Internet communications is the use of a special purpose website known as a Weblog, or often abbreviated as a "blog". Similar to a website, a Weblog is a searchable electronic medium that can be accessed with a Web browser. However, in contrast to a website which typically consists of a home page which can link to any number of sub-pages, a Weblog consists of a single main page. On this page the Weblog's author, or blogger, can add entries regarding a topic of interest. For example, if a blogger is interested in technology, the blogger might attend a technological trade show and post entries to his Weblog regarding new products featured at the show. Similarly, if a blogger is interested in a certain disease, the blogger may post a recent medical advancement in the treatment of the disease as an entry to his Weblog. Notably, a business user can post the status of an on-going project to his Weblog for other project members to see.

Entries posted to a Weblog are typically arranged on a page in a vertical column format, in reverse-chronological order, from the most recent entry to least recent. When the blogger adds a new entry, it is posted to the top of the vertical column, pushing all the older entries down the column. While typical Weblog entries consist of simple text blurbs or links to other websites, the entries can include electronic files such as images, documents, binary objects, as well as multimedia elements such as audio and video. Moreover, the types of Weblogs are as diverse as the content on the Web itself. Many Weblogs invite feedback through discussion postings, and Weblogs often point to other Weblogs in an ecosystem of news, opinions, and ideas known as the Blogosphere.

On-line publishing through Weblogs has become an increasingly significant form of on-line communication and information distribution. Business users have begun to deploy Weblogs to facilitate communication within corporate groups, departments and project teams. As interactive communication software, such as instant messaging, also continues to grow as a key method for electronic communication, especially within the business environment, there is a need to integrate the two environments of instant messaging and Weblog publishing.

SUMMARY OF THE INVENTION

The present invention provides a method, system, and apparatus for publishing instant messages exchanged during an instant messaging session to one or more Weblogs. The present invention can compile the instant messages exchanged during an instant messaging session into an instant messaging transcript. Instant messages can include electronic files such as text-only, images, documents, binary objects, and multimedia files such as audio and video. The instant messaging transcript can be transmitted to one or more Weblogs, and formatted for visual display on the Weblog, in accordance with user specifications.

One aspect of the present invention can include a method of sharing instant messaging transcripts. The method can include: (a) establishing an instant messaging session; (b) receiving a user request to publish a transcript of the session to a Weblog; and (c) publishing the transcript to the Weblog. Each of the steps, (a), (b), and (c), can be performed by an instant messaging client. The method can also include saving the transcript to a portion of memory that is local to the instant messaging client.

In one embodiment of the present invention, step (c) can include detecting a state change in the portion of memory, and, responsive to detecting a state change, sending the transcript to the Weblog. In another embodiment of the invention, step (c) can include receiving a second user input requesting that the transcript be sent to the Weblog. Thus, upon receiving a second user input, the transcript can be sent to the Weblog.

One embodiment of the invention can include formatting the transcript according to a predefined template, wherein the predefined template specifies one or more Weblogs to which the transcript can be published, or one or more sections of a Weblog to which the IM transcript can be stored. In another embodiment of the invention, the template specifies instructions for processing the Weblog according to the identity of the sender.

One aspect of step (a) can include exchanging electronic documents within the instant messaging session, wherein the electronic document is saved as part of the transcript. Notably, the electronic document can specify multimedia content.

In another embodiment of the invention, step (a) can include joining a Weblog agent to the instant messaging session, wherein the Weblog agent records transactions of the instant messaging session. This embodiment further includes sending the transcript to the Weblog using the Weblog agent. Additionally, the transcript can be formatted according to a template using the Weblog agent.

Another aspect of the present invention can include a system for sending an instant messaging transcript to a Weblog. The system can include one or more instant messaging clients configured to publish a transcript generated during an instant messaging session, a server configured to establish an on-line interactive communication session between at least two of the instant messaging clients, and a server configured to receive the transcript from one of the instant messaging clients. The system further can include one or more instant messaging clients configured to automatically publish a transcript of the instant messaging session to the server responsive to a user request. Additionally, an instant messaging client can be configured to establish an instant messaging session, store a transcript of the instant messaging session, and automatically publish the transcript to a Weblog responsive to a user request, or as a scheduled event.

Other embodiments of the present invention can include a system having means for performing the various steps disclosed herein, as well as a machine readable storage for causing a machine to perform the steps described herein.

BRIEF DESCRIPTION OF THE DRAWINGS

There are shown in the drawings, embodiments which are presently preferred, it being understood, however, that the invention is not limited to the precise arrangements and instrumentalities shown.

FIG. 4 is a flow chart illustrating a method of publishing instant messaging transcripts to Weblogs, in accordance with one embodiment of the present invention.

FIG. 5 is a flow chart illustrating yet another embodiment of publishing instant messaging transcripts to Weblogs, in accordance with another embodiment of the present invention.

DETAILED DESCRIPTION OF THE INVENTION

The invention provides a solution for integrating instant messaging with Weblog publishing. In particular, an instant messaging transcript (hereinafter "IM transcript"), which is generated during an instant message exchange (hereinafter "IM session"), can be published to a Weblog for public viewing. The IM transcript is a record of most, if not all, IMs exchanged during the IM session, in the chronological order in which they were sent. The IM transcript can include simple text based messages, as well as the contents of any electronic document attached to exchanged IMs, for example audio and video files. Additionally, the IM transcript can include a time stamp for each recorded message and electronic file transaction.

IM transcripts can be published to one or more Weblog destinations. Additionally, IM transcripts can be formatted according to a set of attributes which define how the IM transcript should appear on the Weblog site. For example, the IM transcript can be displayed on a Weblog substantially the same as it appeared on a client's graphical user interface (GUI) during the IM session. Alternatively, the IM transcript can be formatted so that the text in the IM transcript is bolded or displayed in a particular font. In one embodiment of the invention, the Weblog destination and formatting instructions can be based on the identity of the user. In another embodiment, the Weblog destination and formatting instructions can be based on a pre-defined template.

Figure 1:
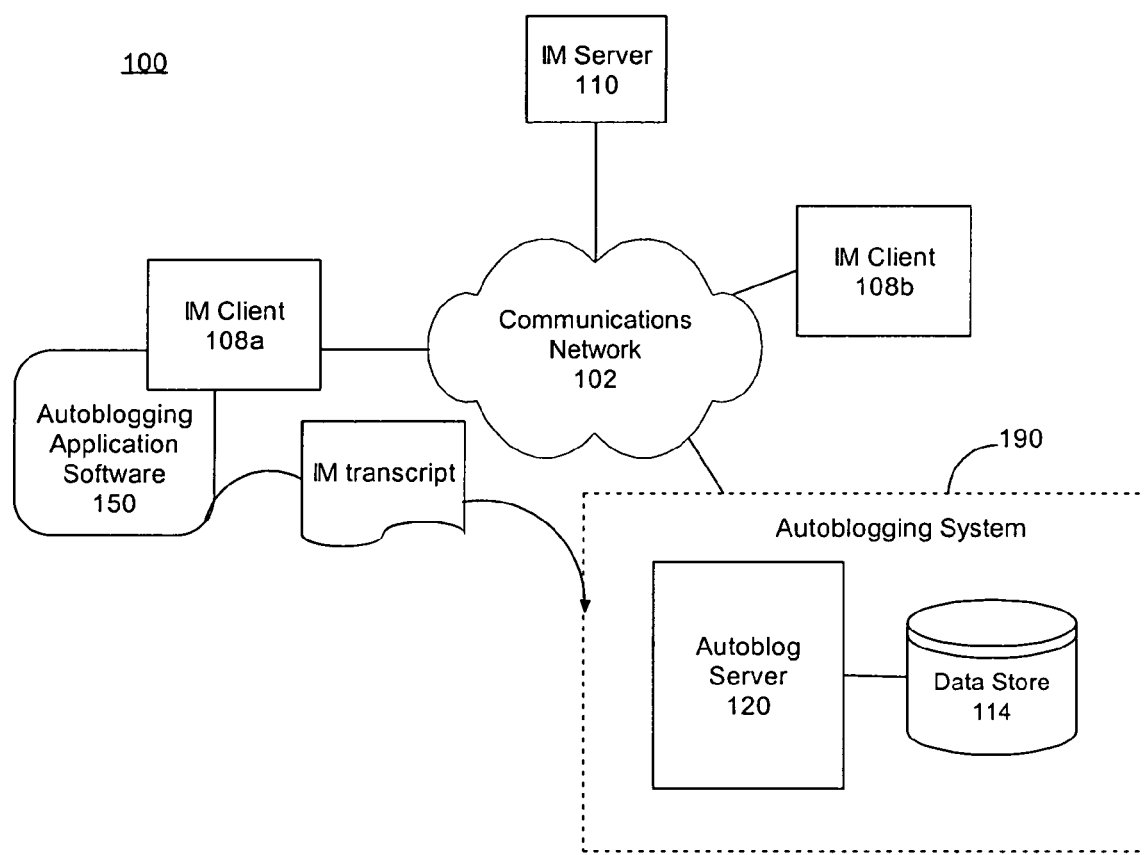
FIG. 1 is a schematic diagram illustrating a system for publishing an instant messaging transcript to a Weblog in accordance with the inventive arrangements disclosed within.

FIG. 1 is a diagram of an exemplary system 100 for publishing an IM transcript to a Weblog. As shown in FIG. 1, system 100 can include one or more instant messaging clients 108a and 108b, an instant messaging server 110, and an Autoblogging system 190. The aforementioned components can be communicatively linked to a communications network 102, which can include the Internet, a wide area network (WAN), a local area network (LAN), and a public switched telephone network (PSTN). The communications network 102 also can include cable data networks, wireless communications networks, or any other network, including associated gateway/access points through which instant messaging service can be provided to users.

The instant messaging clients 108a and 108b (hereinafter "clients") can be software applications, each executing within an information processing system, configured to enable real-time communication across the communications network 102. The clients 108a and 108b can operate as standalone applications or can operate within a browser. As is well known in the art, clients 108a and 108b can enable users to communicate with each other via the exchange of IMs. During an IM session, users can exchange IMs in the form of electronic files which can include text-only messages, images, documents, binary objects, and any other electronic document capable of being transferred over the communication network 102. Additionally, an IM can include multimedia electronic files such as audio and video. The IMs exchanged within an IM session can be compiled and stored in the form of a IM transcript. Subsequently, clients 108a and 108b can be configured to send the IM transcript to the Autoblogging system 190 for publication to a Weblog.

The instant messaging server 110 (hereinafter "IM server") can include a registry specifying which users have logged onto the IM server and thus are available to participate in an IM session. The IM server 110 can function as a central repository for receiving IMs from clients and forwarding those messages to other clients. The Autoblogging system 190 can include an Autoblog server 120 and data store 114. The Autoblog server 120 can be configured to receive IM transcripts from clients 108a and 108b.

In operation, the clients 108a and 108b can establish a communications link with the communications network 102. For example, the client 108b can be included within a wireless phone configured for communications using short message service, a personal digital assistant, or other communications device, such as a general purpose computer, capable of connecting to the communications network 102 via a suitable gateway. Thus, although not depicted, it should be appreciated that the clients 108a and 108b can be included within communications devices which can connect to the communications network 102 via cable networks, digital subscriber line connections, wireless networks, and the like.

Once the clients 108a and 108b are connected to the communications network 102, the clients can log onto the IM server 110. Accordingly, the IM server 110 can maintain a listing specifying that the clients 108a and 108b are available for instant messaging communications. Client 108a can initiate an IM to client 108b. Likewise, client 108b can receive the IM from client 108a and respond by sending an IM to client 108b. As is well known in the art, this exchange of electronic messages via the communications network 102 constitutes an IM session. Although the illustration disclosed herein indicates that client 108a initiates communications, it should be appreciated that either client 108a or 108b can initiate communications.

At any point during, or upon the conclusion of the aforementioned IM session, client 108a can compile all the IMs exchanged within the IM session into a IM transcript. The client can save the IM transcript to a portion of memory, for example a location in memory or a specified file folder (hereinafter "IM transcript folder"). Responsive to an IM transcript being saved to the IM transcript folder, the Autoblogging application software 150 can be initiated. The Autoblogging application software 150 can be integrated in the client 108a as a plug-in or can operate as a standalone application configured to cooperatively interact with the client 108a. Moreover, although the illustration disclosed herein indicates that client 108a is integrated with the Autoblogging application software 150, it should be appreciated that either client 108a and/or 108b can include Autoblogging application software 150.

According to one embodiment of the present invention, the Autoblogging application software 150 can continuously monitor the IM transcript folder for a state change. Upon the detection of a state change, the Autoblogging application software 150 can automatically send the IM transcript to the Autoblogging system 190. According to an alternative embodiment of the present invention, Autoblogging application software 150 can send the IM transcript to the Autoblogging system 190 responsive to a request from client 108a.

According to the inventive arrangements of FIG. 1, responsive to receiving a IM transcript from client 108a, Autoblogging system 190 can publish the IM transcript to one or more Weblogs. According to one embodiment of the present invention, the Autoblog server 120 can process the IM transcript based on the identity of the client. This activity could also manifest through a scheduled event. According to another embodiment of the present invention, the server can process the IM transcript according to one of a plurality of pre-defined templates stored within the data store 114. Alternatively, the pre-defined templates can be physically stored remotely and accessed through a network-based service.

Figure 2:
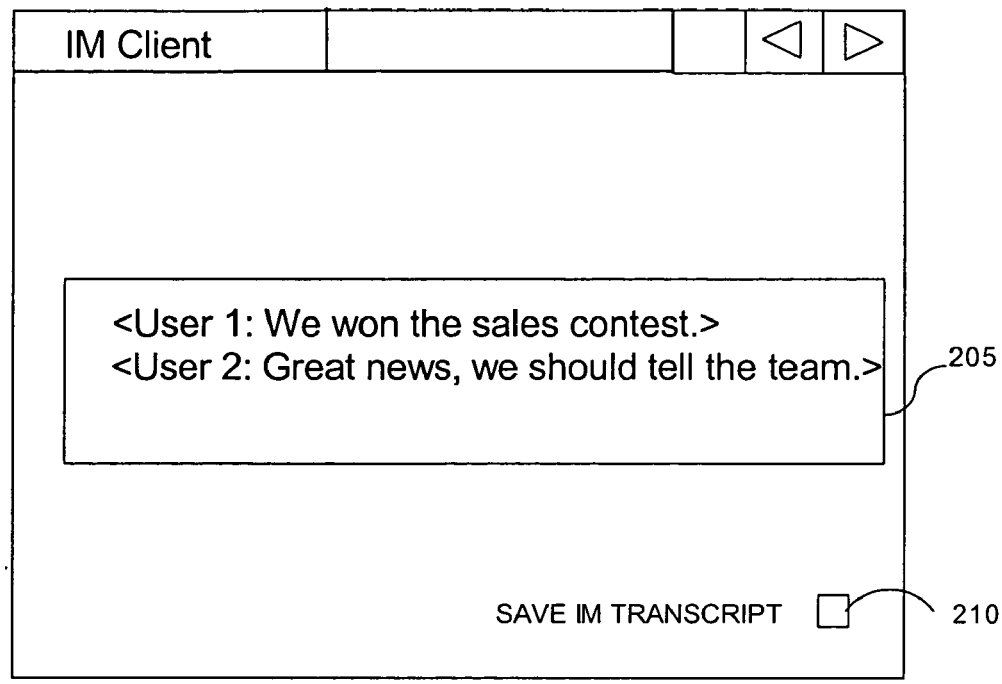
FIG. 2 is a schematic diagram illustrating one embodiment of a graphical user interface (GUI) in accordance with the inventive arrangements disclosed herein.

FIG. 2 is a schematic diagram illustrating one embodiment of a GUI 200 for use with the clients of FIG. 1. The GUI 200 can be presented, by the client, to a user when an IM session is initiated. The GUI 200 depicts an exemplary IM session between two participants: user 1 and user 2. User 1 has initiated an IM session with user 2. Accordingly, the IM from user 1 has been received by the client of user 2. Similarly, the responsive IM from user 2 has been received by the client of user 1. As is well known in the art, this exchange of IMs can be presented to the user in the form of scrolling dialog, as shown in the IM transcript dialog box 205.

As shown, the GUI 200 can include a control 210 for specifying that the IMs displayed in the dialog box 205 are to be compiled and saved as an IM transcript. Activation of control 210 can cause the IM transcript to be saved to a memory location, previously referred to as the IM transcript folder. Upon the detection of a state change in the IM transcript folder, the client can automatically send the IM transcript to the Autoblogging system for subsequent posting to one or more Weblogs.

Figure 3:
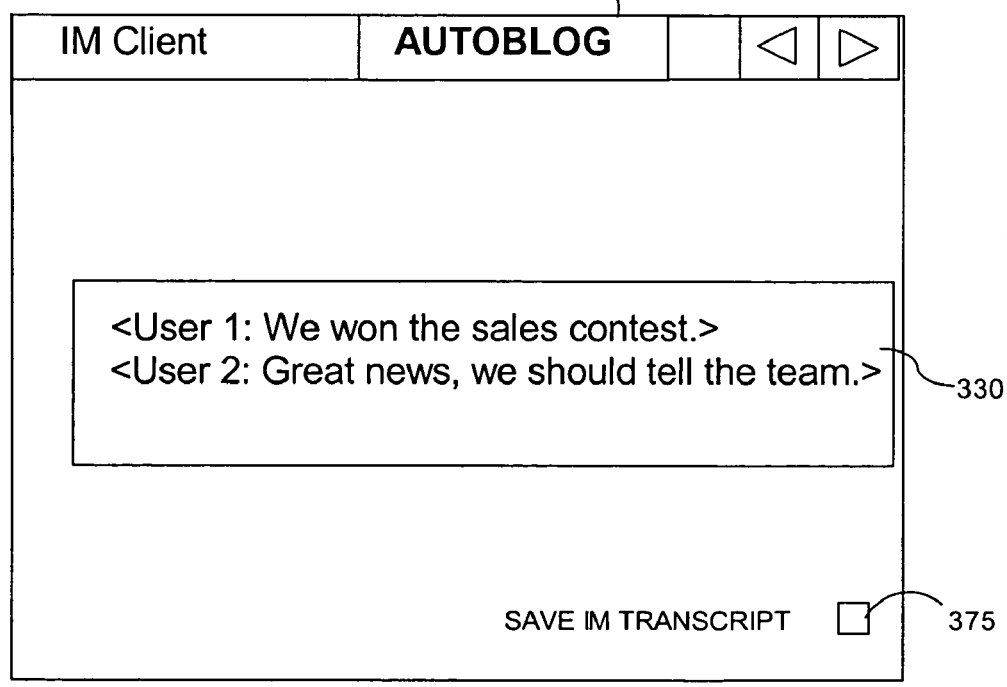
FIG. 3 is a schematic diagram illustrating another embodiment of a GUI in accordance with the inventive arrangements disclosed herein.

FIG. 3 is a schematic diagram illustrating another embodiment of a GUI 300 for use with the clients of FIG. 1. Similar to GUI 200, GUI 300 depicts an exemplary IM session between two participants: user 1 and user 2. Also similar to the embodiment illustrated in FIG. 2, activation of control 375 specifies that the IMs displayed in the dialog box 330 are to be compiled and saved as an IM transcript in the IM transcript folder. In this embodiment, however, the saved IM transcript is not sent to the Autoblogging system 190 until such time that control 380 is activated by a user.

GUI 200 and 300, depicted in Figs. 2 and 3 respectively, have been provided for purposes of illustration only. It should be appreciated by those skilled in the art that such GUIs can be implemented in a variety of different configurations using an assortment of control mechanisms. As such, GUI 200 and 300 are not intended as limitations of the present invention. Further, while the GUI 200 and 300 are for use with an instant messaging system, it should be appreciated that similar GUIs can be used with reference to an e-mail system or other type of electronic messaging system.

FIG. 4 is a flow chart illustrating a method 400 of sending IM transcripts to Weblogs, in accordance with the system of FIG. 1. The method 400 can begin in a state wherein one or more users have established a presence online, whether via a dial-up connection, a wireless connection, and/or another network connection. In step 405, the users can log onto the IM server. For example, through a client, two or more users can provide a user name and/or password. Logging onto the IM server indicates that the users are online and are capable of sending and receiving IMs.

In step 410, two or more users can begin exchanging IMs thereby forming an IM session. The resulting IM session can generate a scrolling dialog which can be presented in each client's GUI. In step 415, the user can activate a control within the GUI which compiles the IM session in the form of a IM transcript and saves it to a specified portion of memory, for example to a memory location or the IM transcript folder.

In step 420, the IM transcript, which has been previously saved in step 415, can be transmitted to the Autoblogging system. For example, in one embodiment of the present invention, the Autoblogging application software can continuously monitor the designated portion of memory for a state change. Responsive to the detection of a state change, the IM transcript can be automatically sent to the Autoblogging system and the method can continue to step 425. According to an alternative embodiment of the present invention, the user can initiate a save of the IM transcript in step 415, and then initiate a transmission of the IM transcript to the Autoblogging system in a separate action, for example through the activation of a separate control within the client GUI.

In step 425, upon receiving the IM transcript, the Autoblogging system can process the IM transcript, which can include assigning one or more Weblog destinations to the IM transcript, as well as formatting the IM transcript for visual display on the Weblog. In one embodiment of the present invention, the Autoblogging system can be configured to process the IM transcript based on the identity of a user. For example, a user may prefer to always send IM transcripts to his personal Weblog as well as his project team's Weblog. Additionally, the user may desire the text of the IM transcript to appear in a particular font and color on the Weblog. Accordingly, upon receiving a IM transcript from a user, the Autoblogging system can point to a memory location associated with that user. The memory location can include destination information, such as Internet Protocol (IP) addresses and uniform resource locators (URLs), as well as formatting attributes, such as Hypertext Markup Language (HTML) tags, or Really Simple Syndication (RSS) feed formats, in accordance with the user's specifications.

In another embodiment of the invention, the Autoblogging system can be configured to process an IM transcript according to a pre-defined template. (hereinafter "IM template"). For example, an Autoblogging system can include a plurality of IM templates stored in a data store. Similar to the embodiment above, the IM template can include destination and formatting data, such as URLs and HTML tags. For example, a "work" template can specify that the IM transcript is to be published on the company Weblog, whereas a "project team" template can specify that the IM transcript be published to the project team Weblog, as well the project manager's Weblog. Accordingly, a client can send a IM transcript with a pointer which selects an IM template within the data store. Upon receiving the IM transcript, the Autoblogging system can process the IM transcript according to the template indicated by the pointer.

In step 430 the Autoblog server can transmit the processed IM transcript to one or more Weblogs for publication using any one of a variety of Web-based toolsets.

FIG. 5 is a flow chart illustrating yet another embodiment of publishing IM transcripts to Weblogs, in accordance with the system of FIG. 1. Method 500 is substantially similar to that of FIG. 4. That is, in step 505, the users can log onto the IM server, and in step 510, two users can begin exchanging IMs thereby forming an IM session. In step 515, however, responsive to a request from a user, a Weblog agent can join the IM session. The Weblog agent can be a software application, executing within an information processing system. The Weblog agent can join the IM session at any point during the IM session. Accordingly, the Weblog agent can be configured to passively record the IM session. That is, the Weblog agent acts as a listener but takes no active role in the IM session beyond recording messages exchanges between the IM session participants. While the aforementioned Weblog agent can be local or part of a client, the Weblog agent also can be located in a remote information processing system. If so, responsive to a user request, a message can be sent to the Weblog agent thereby causing the Weblog agent to be joined and begin recording the IM session. It should be appreciated by those skilled in the art that the Weblog agent can also be joined to the IM session via electronic conferencing.

In step 520, regardless of what point in the IM session the Weblog agent joins, the Weblog agent can track and record all the IMs exchanged from the beginning of the IM session to the point at which it joined. Additionally, the Weblog agent can track and record all subsequent IMs exchanged after joining the IM session. In step 530, responsive to a signal that the IM session has terminated, for example as transmitted from one of the clients or the IM server, the Weblog agent can compile all parts of the IM session into an IM transcript. Notably, the Weblog agent also can detect when the IM session terminates.

In step 540 the Weblog agent can process the IM transcript, which can include assigning one or more Weblog destinations to the IM transcript, as well as formatting the IM transcript for visual display on the Weblog. Similar to the embodiment described in FIG. 4, the Weblog agent can be configured to process the IM transcript based on the identity of the user. Also similar to another embodiment of FIG. 4, the Weblog agent can be configured to process the IM transcript according to an IM template stored in a data store. The Weblog agent can store the destination and formatting data in a storage device, such as a data store. In step 550 the Weblog agent can transmit the processed IM transcript for publication to one or more Weblogs.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of publishing instant messages exchanged during an instant messaging session to one or more Weblogs comprising the steps of:
   establishing an instant messaging session among two or more users logged onto an instant messaging server;
   presenting a graphic user interface to each of the users;
   activating by a user a first control within the graphic user interface;
   recording the instant messaging session upon activation of the first control;
   compiling a transcript from the recorded instant messaging session and saving the compiled transcript to a specified portion of a memory;
   activating by the user a second control within the graphic user interface, wherein the second control is separate from the first control;
   transmitting the saved transcript to a blogging system upon activation of the second control;
   determining a destination of at least one Weblog based on information associated with the user;
   generating an indicator indicating at least one of a format, font, and color in which the transcript is to be published based on the information associated with the user; and
   publishing the transcript to the at least one Weblog according to the indicator.

2. The method of claim 1, further comprising formatting the transcript according to a predefined template.

3. The method of claim 2, wherein the predefined template specifies one of a plurality of Weblogs to which the transcript is published, or one of a plurality of sections of the Weblog to which the IM transcript is stored.

4. The method of claim 2, wherein the template specifies instructions for processing the Weblog according to an identity of a sender.

5. The method of claim 1, said establishing step further comprising the step of joining a Weblog agent to the instant messaging session, wherein the Weblog agent records transactions of the instant messaging session.

6. The method of claim 5, said publishing step further comprising sending the transcript to the Weblog using the Weblog agent.

7. The method of claim 5, further comprising formatting the transcript according to a template using the Weblog agent.

8. The method of claim 1, said establishing step further comprising the step of exchanging electronic documents within the instant messaging session, wherein the electronic document is saved as part of the transcript.

9. The method of claim 8, wherein the electronic document specifies multimedia content.

10. The method of claim 1, said publishing step further comprising:
   detecting a state change in the portion of the memory; and
   responsive to said detecting step, sending the transcript to the Weblog.

11. The method of claim 1, further comprising:
   receiving a user request to join a Weblog agent to the instant messaging session;
   recording the instant messaging session by the Weblog agent; and
   compiling the recorded instant messaging session into the transcript upon termination of the instant messaging session.

12. A system of publishing instant messages exchanged during an instant messaging session to one or more Weblogs comprising the steps of:
   an instant messaging server for establishing an instant messaging session among two or more users logged onto the instant messaging server;
   a graphic user interface presented to each of the users, the graphic user interface including a first control and a second control separate from the first control;
   means for recording the instant messaging session upon activation of the first control by a user;
   means for compiling a transcript from the recorded instant messaging session and saving the compiled transcript to a specified portion of a memory;
   means for transmitting the saved transcript to a blogging system upon activation of the second control;
   means for determining a destination of at least one Weblog based on information associated with the user;
   means for generating an indicator indicating at least one of a format, font, and color in which the transcript is to be published based on the information associated with the user; and
   means for publishing the transcript to the at least one Weblog according to the indicator.

13. A machine readable storage, having stored thereon a computer program having a plurality of code sections executable by a machine for causing the machine to perform the steps of:
   establishing an instant messaging session among two or more users logged onto an instant messaging server;
   presenting a graphic user interface to each of the users;
   activating by a user a first control within the graphic user interface;
   recording the instant messaging session upon activation of the first control;
   compiling a transcript from the recorded instant messaging session and saving the compiled transcript to a specified portion of a memory;
   activating by the user a second control within the graphic user interface, wherein the second control is separate from the first control;
   transmitting the saved transcript to a blogging system upon activation of the second control;
   determining a destination of at least one Weblog based on information associated with the user;
   generating an indicator indicating at least one of a format, font, and color in which the transcript is to be published based on the information associated with the user; and
   publishing the transcript to the at least one Weblog according to the indicator.

* * * * *

UNITED STATES PATENT AND TRADEMARK OFFICE
CERTIFICATE OF CORRECTION

PATENT NO. : 7,653,692 B2  
APPLICATION NO. : 10/736025  
DATED : January 26, 2010  
INVENTOR(S) : Creamer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1118 days.

Signed and Sealed this

Twenty-third Day of November, 2010

David J. Kappos  
*Director of the United States Patent and Trademark Office*